July 28, 1925.
J. O. YORK ET AL
1,547,634
SHOCK ABSORBER
Filed Jan. 25, 1921
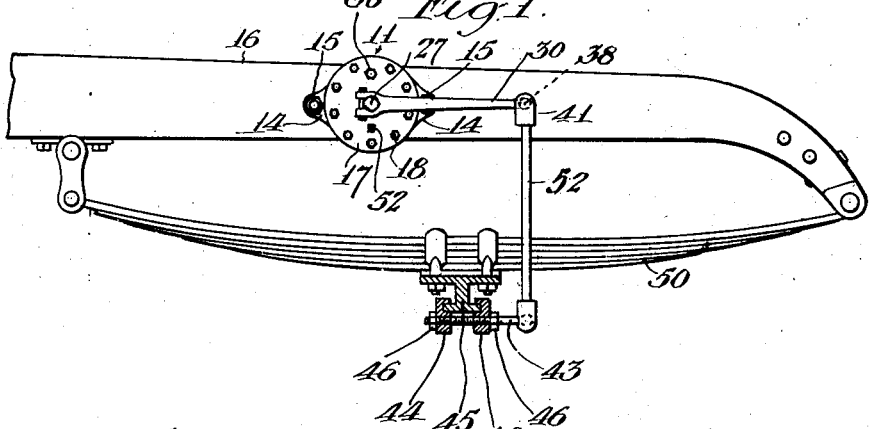
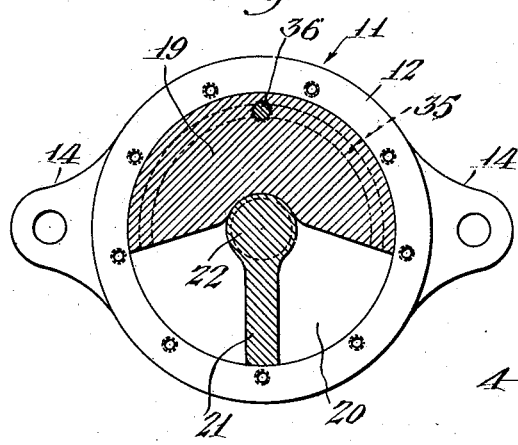
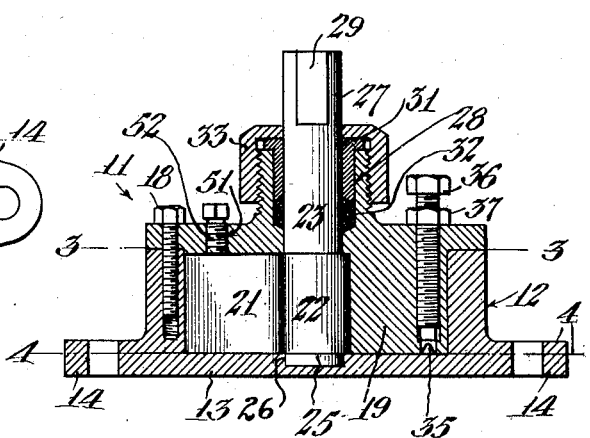
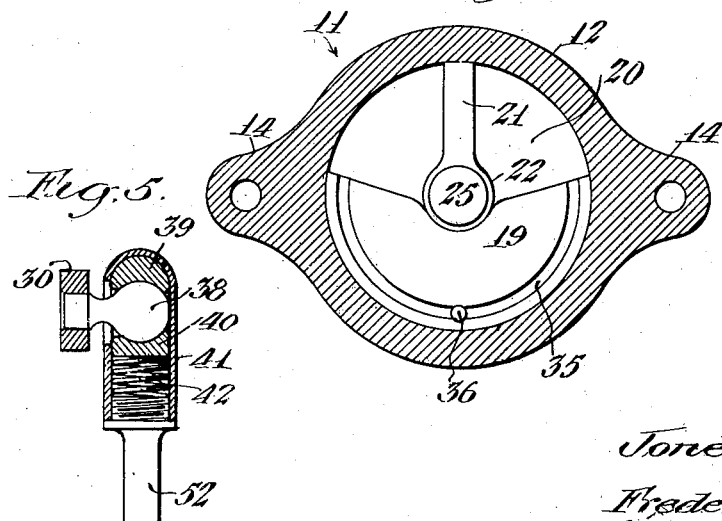
Inventors
Jones O. York
Frederick Barnett
by Graham and Harris
Attorneys Patented July 28, 1925.

1,547,634

UNITED STATES PATENT OFFICE.

JONES O. YORK AND FREDERICK BARNETT, OF LONG BEACH, CALIFORNIA, ASSIGNORS, BY DIRECT AND MESNE ASSIGNMENTS, TO SAID BARNETT.

SHOCK ABSORBER.

Application filed January 25, 1921. Serial No. 439,765.

*To all whom it may concern:*

Be it known that we, JONES O. YORK and FREDERICK BARNETT, both citizens of the United States, residing at Long Beach, in the county of Los Angeles and State of California, have invented a new and useful Shock Absorber, of which the following is a specification.

Our invention relates to shock absorbers for vehicles of the type in which the body member is supported on springs mounted on the axles of the vehicle.

The principal object of our invention is to provide a shock absorber of extremely simple construction which will efficiently prevent the transmission of shocks and jars to the body due to the wheels of the vehicle passing over uneven surfaces of the road.

Other objects and advantages will appear hereinafter from the following description and drawings.

Referring to the drawings which are for illustrative purposes only,

Fig. 1 is a side elevation partly in section of the forward end of a vehicle showing a shock absorber embodying our invention mounted thereon.

Fig. 2 is a sectional plan view of the shock absorber.

Fig. 3 is a sectional view on line 3—3, Fig. 2.

Fig. 4 is a sectional view on line 4—4, Fig. 2, and

Fig. 5 is a sectional view of a joint used in the connections.

The shock absorber generally indicated at 11 consists of a cylinder 12 closed at one end by a wall 13 provided with ears 14 arranged to receive bolts 15 by means of which the device is connected to the automobile frame 16. The opposite end of the cylinder is closed by a plate 17 secured to the cylinder by means of bolts 18. Formed on the plate 17 is an abutment or wall 19, the end of which engages the inner face of the wall 13 and the outer face of which fits against the inner face of the cylinder being shaped to conform to the contour of the cylinder. The abutment fills approximately one-half of the cylinder thereby forming a fluid containing chamber 20 into which extends a flat blade or piston 21 which divides the chamber into two parts.

The blade 21 extends outwardly from a hub 22 formed on a shaft 23, such hub engaging the plate 17 at one end and the wall 13 at the other end. The inner end 25 of the shaft 23 is rotatably mounted in a circular recess 26 formed in the wall 13 and the outer end 27 of the shaft 23 extends through a gland 28 to the outside of the shock absorber, such end 27 being flattened, as indicated at 29, to receive an arm 30 secured thereto. Extending into the gland 28 is a sleeve or follower 31 which engages packing indicated at 32, such follower being secured in the gland by means of an interiorly threaded nut 33 threaded onto the gland. The chambers on the opposite sides of the blade 21 are in open communication through a V-shaped passage 35 formed in the face of the inner end of the abutment 19, the passage of liquid through such passage being regulated by means of a screw 36, the inner end of which extends into such passage. A lock nut 37 is provided for the screw 36 whereby the screw may be locked in adjusted position when regulated.

The outer end of the arm 30 is provided with a ball 38 engaged between semi-circular blocks 39 and 40 mounted in a casing 41, the block 40 being yieldingly held against the ball 38 by means of a coiled spring 42 in the casing 41.

The casing 41 is secured to one end of a connecting rod 52, the other end of such rod being similarly constructed to receive a ball formed on the end of a bolt 43 which extends through clips 44 which engage the axle 45, nuts 46 being provided for the bolt whereby the clips are clamped to the axle. 50 designates the springs which are mounted upon the axle, the ends of the spring being attached in the usual manner to the frame 16.

The cylinder is filled with liquid preferably oil through an opening 51 in the plate 17 entirely filling the chamber 20 and passage 35, a screw plug 52 being provided to effectually close the filling opening.

It is understood that when a vehicle passes over uneven places in a road that shocks are imparted to the running gear which are transmitted to the body of the vehicle through the springs, the weight of the body causing a rebound to take place. Any relative movement between the axle and the body frame is transmitted to the shock absorber through the rod 52 and arm 30 which arm causes the blade 21 to move in the cylinder in one direction or the other according to the direction of the shock. The movement of the blade causes the oil in the chamber to move from one side of the blade to the other through the restricted passage 35 thereby absorbing to some extent the shock by the cushioning effect produced.

We claim as our invention:

1. A shock absorber comprising a cylinder closed at one end by a wall having a recess formed therein, a plate covering the other end of the cylinder having a shaft opening therein, an abutment formed integral with said plate extending into said cylinder and filling approximately half of said cylinder to form an oil chamber therein, a shaft extending through said plate having its inner end seated in the recess in the end wall of the cylinder, a hub formed on said shaft engaging the end wall of the cylinder at one end and said plate at the other end, a blade formed on said hub extending into said oil chamber and dividing said chamber, the chamber on each side of said blade having communication through a passage formed in the end face of said abutment whereby oil may pass in either direction through said passage, a screw mounted in said abutment extending into said passage, a gland formed on said plate, a sleeve extending into said gland, a retaining nut on said gland for said sleeve, means for filling said oil chamber, means for mounting said cylinder on the frame of a vehicle, an arm secured to said shaft, a rod connected to said arm, and a connection between said rod and the axle of the vehicle.

2. A shock absorber for vehicles comprising a cylinder, a plate closing the end of the cylinder, an abutment formed integral with said plate extending into said cylinder to form an oil receiving chamber therein, said abutment having a passage formed in its end face to provide communication in both directions between the opposite sides of the oil chamber, means for regulating the size of said passage, a shaft extending through said plate, and a blade formed on said shaft extending into said chamber dividing said chamber.

3. A shock absorber for vehicles comprising a cylinder, a plate closing the end of said cylinder, an abutment on said plate extending into said cylinder to form an oil receiving chamber therein, said abutment having a passage formed therein to provide communication between opposite sides of said oil chamber, means mounted in said abutment for regulating the size of said passage, a shaft extending through said plate, and a blade formed on said shaft extending into said chamber dividing said chamber.

In testimony whereof, we have hereunto set our hands at Long Beach, California, this 19th day of January, 1921.

JONES O. YORK.
FREDERICK BARNETT.